(12) United States Patent
Nakahara et al.

(10) Patent No.: US 11,865,898 B2
(45) Date of Patent: Jan. 9, 2024

(54) ELECTRIC VEHICLE HVAC SYSTEM WHICH COOLS BATTERY AND CONTROLS GRILLE SHUTTER BASED ON COOLANT PRESSURE

(71) Applicant: MAZDA MOTOR CORPORATION, Hiroshima (JP)

(72) Inventors: Yasuhiko Nakahara, Aki-gun (JP); Masaaki Tanaka, Aki-gun (JP); Taiki Shigemori, Aki-gun (JP); Masaki Nishino, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 159 days.

(21) Appl. No.: 17/138,554

(22) Filed: Dec. 30, 2020

(65) Prior Publication Data

US 2021/0260959 A1    Aug. 26, 2021

(30) Foreign Application Priority Data

Feb. 25, 2020  (JP) ................. 2020-029427

(51) Int. Cl.
*B60H 1/00* (2006.01)
*B60K 11/08* (2006.01)

(52) U.S. Cl.
CPC ..... *B60H 1/00871* (2013.01); *B60H 1/00278* (2013.01); *B60H 1/00392* (2013.01);
(Continued)

(58) Field of Classification Search
CPC ........... B60H 1/00278; B60H 1/00392; B60H 1/00764; B60H 1/00807; B60H 1/00871;
(Continued)

(56) References Cited

U.S. PATENT DOCUMENTS

2013/0046445 A1* 2/2013 Nishimura ........... B60K 11/085
  701/49
2016/0347303 A1* 12/2016 Murata ................. B60W 20/13
(Continued)

FOREIGN PATENT DOCUMENTS

JP    2015-104974 A    6/2015
JP    2016002863 A  *  1/2016
(Continued)

OTHER PUBLICATIONS

Moran MJ, Shapiro HN. Fundamentals of Engineering Thermodynamics. vol. 5th ed. John Wiley and Sons, Inc; 2006. (Year: 2006).*

*Primary Examiner* — Edelmira Bosques
*Assistant Examiner* — Brett Peterson Mallon
(74) *Attorney, Agent, or Firm* — Studebaker & Brackett PC

(57) ABSTRACT

Coolant flowing from a compressor passes through a heat exchanger and opening-degree adjustable type of expansion valves for heating, and an external heat exchanger. The coolant passing through the external heat exchanger is capable of passing through an expansion valve and a heat exchanger for cooling, and an expansion valve and a heat exchanger for cooling a battery. A grille shutter to change an introduction state of traveling air is provided in front of the external heat exchanger. When pressure of the coolant (particularly, pressure of the coolant at a timing after the coolant passes through the external heat exchanger) is a specified pressure or lower, the grille shutter is closed, whereby the heat-exchange performance of the external heat exchanger is lowered.

16 Claims, 11 Drawing Sheets

(52) U.S. Cl.
 CPC ..... *B60H 1/00764* (2013.01); *B60H 1/00807* (2013.01); *B60K 11/085* (2013.01)

(58) Field of Classification Search
 CPC .. B60H 1/32; B60H 1/22; B60H 2001/00949; B60K 11/085; B60K 1/143; B60K 11/04
 See application file for complete search history.

(56) References Cited

U.S. PATENT DOCUMENTS

| | | | |
|---|---|---|---|
| 2018/0312053 A1* | 11/2018 | Moro | B60K 11/06 |
| 2019/0100093 A1* | 4/2019 | Mizuno | B60K 6/48 |
| 2019/0283528 A1* | 9/2019 | Ishida | B60H 1/3211 |
| 2020/0047583 A1* | 2/2020 | Ishizeki | B60H 1/143 |
| 2020/0158382 A1 | 5/2020 | Kato et al. | |
| 2020/0171919 A1* | 6/2020 | Ishizeki | B60H 1/00914 |

FOREIGN PATENT DOCUMENTS

| | | | | |
|---|---|---|---|---|
| JP | 2018-184108 A | | 11/2018 | |
| JP | 2019026118 A | | 2/2019 | |
| JP | 2019130980 A | | 8/2019 | |
| JP | 2019155999 A | * | 9/2019 | |
| JP | 2020-019397 A | | 2/2020 | |
| JP | 2021-046059 A | | 3/2021 | |

\* cited by examiner

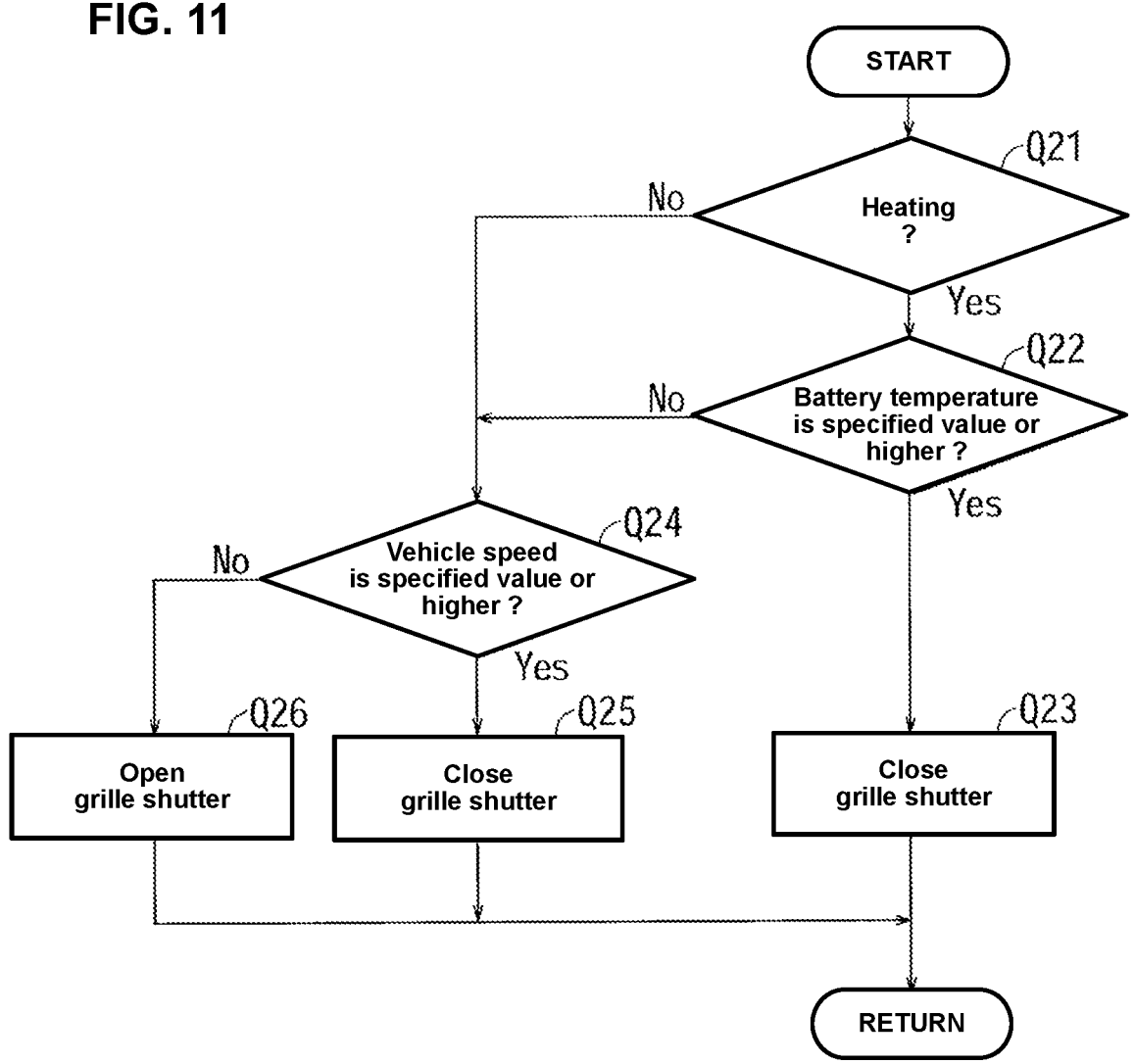

ELECTRIC VEHICLE HVAC SYSTEM WHICH COOLS BATTERY AND CONTROLS GRILLE SHUTTER BASED ON COOLANT PRESSURE

BACKGROUND OF THE INVENTION

The present invention relates to an air conditioner for a vehicle.

In recent vehicles (automobiles), the number of an electric automobile which is driven by a motor only, not by an engine (internal combustion engine), tends to increase.

Air conditioning of a cabin inside is required even in the electric automobile. It is desired that both heating and cooling can be performed by a heat pump type using coolant which is compressed by a compressor in order to execute the air conditioning of the cabin inside. Accordingly, a heat exchanger for heating, an external heat exchanger to perform heat exchange between outside air and coolant, and an expansion valve for cooling and a heat exchanger for cooling are required.

Meanwhile, the electric automobile installs a large-capacity battery to supply a power to a motor for vehicle driving. Herein, when the temperature of the battery becomes a specified temperature or higher through its charging/discharging, it is necessary to cool the battery. This cooling of the battery requires an expansion valve for battery and a heat exchanger for battery in a case where the cooling is executed by using the coolant.

Japanese Patent Laid-Open Publication No. 2019-130980 discloses a technology that coolant for cabin-inside air conditioning and coolant for battery cooling are provided independently from each other. Further, Japanese Patent Laid-Open Publication No. 2019-26118 (US 2020/0158382 A1) discloses another technology that the battery cooling is not executed but a coolant flow path is switched when the pressure of the coolant decreases.

Meanwhile, it may be considered that the coolant is shared (communized) between the cabin-inside air conditioning and the battery cooling in order to facilitate a system or the like. In this case, since the battery cooling requires the large cooling capability, it is important to control such that the coolant pressure does not decrease excessively. However, it has been found that in a case where the coolant is shared between the cabin-inside air conditioning and the battery cooling, the coolant pressure decreases so excessively that the flow amount of the coolant may be lacking, so that the battery may not be cooled sufficiently.

In particular, there easily occurs a situation where the pressure of the coolant at a timing after the coolant passes through the external heat exchanger performing the heat exchange with the outside air decreases greatly when the heating is executed. In this case, there is a concern that the flow amount of the coolant may be lacking because a decrease of a high-pressure-side pressure of the coolant which passes through the external heat exchanger and then passes through the expansion valve for battery cooling becomes excessive. This lack of the flow amount of the coolant may cause insufficient decrease of the coolant pressure (i.e., coolant temperature), so that the cooling performance of the heat exchanger for battery cooling may be deteriorated.

Herein, it may be considered that there is provided a bypass system in which when the coolant pressure decreases to a specified pressure or lower, the coolant flows bypassing the external heat exchanger. In this case, however, the system may become complex and cause costs increase improperly.

SUMMARY OF THE INVENTION

The present invention has been devised in view of the above-described matters, and an object of the present invention is to provide an air conditioner for a vehicle which can perform the battery cooling sufficiently, without making the system complex, even in a case where the coolant is shared between the cabin-inside air conditioning and the battery cooling.

A first aspect of the present invention is an air conditioner for a vehicle, comprising a battery as a power supply source of a motor for vehicle driving, a compressor to compress coolant, a heat exchanger for heating to heat a cabin inside, an external heat exchanger capable of introducing traveling air thereinto and to perform heat exchange between outside air and coolant, an expansion valve for cooling and a heat exchanger for cooling which are provided to cool the cabin inside, an expansion valve for battery and a heat exchanger for battery which are provided to cool the battery, an opening/closing type of grille shutter to change an introduction state of the traveling air introduced into the external heat exchanger, a pressure sensor to detect pressure of the coolant, and a control unit to control opening/closing of the grille shutter, wherein the coolant is shared among the heat exchanger for heating, the external heat exchanger, the heat exchanger for cooling, and the heat exchanger for battery, and the control unit is configured to make the grille shutter in a closed state when the pressure of the coolant detected by the pressure sensor is a specified pressure or lower.

According to this air conditioner for the vehicle, when the temperature of the coolant is the specified pressure or lower, the heat exchange performance of the external heat exchanger is lowered by closing the grille shutter, so that a situation where the coolant pressure decreases excessively is prevented. Thereby, the battery cooling can be performed sufficiently when the battery cooling is required. Herein, compared to a case where the bypass system in which the coolant flow bypasses the external heat exchanger when the coolant pressure decreases to the specified pressure or lower, the system is preferable in its facilitation and costs reduction.

In an embodiment of the first aspect of the present invention, the air conditioner for the vehicle further comprises a temperature sensor to detect temperature of the battery, wherein the coolant is controlled to flow into the heat exchanger for battery from the expansion valve for battery when the temperature of the battery detected by the temperature sensor is a specified temperature or higher, and the control unit is configured to make the grille shutter in the closed state when the pressure of the coolant detected by the pressure sensor is the specified pressure or lower and the temperature of the battery detected by the temperature sensor is the specified temperature or higher.

According to this air conditioner for the vehicle, since the grille shutter is closed subject to requirement of the battery cooling as well, it is prevented preferably that the heat exchange performance of the external heat exchanger is deteriorated improperly.

In another embodiment of the first aspect of the present invention, passing of the coolant through the expansion valve for cooling and the heat exchanger for cooling and passing of the coolant through the expansion valve for battery and the heat exchanger for battery are respectively executed after the coolant passes through the external heat exchanger, there is provided a switching device to switch a flow pattern of the coolant after passing through the external heat exchanger among a first pattern, a second pattern, and a third pattern, the first pattern being configured such that the coolant passes through the expansion valve for cooling and the heat exchanger for cooling but the coolant does not pass through the expansion valve for battery and the heat exchanger for battery, the second pattern being configured such that the coolant passes through the expansion valve for battery and the heat exchanger for battery but the coolant does not pass through the expansion valve for cooling and the heat exchanger for cooling, the third pattern being configured such that the coolant passes through the expansion valve for cooling and the heat exchanger for cooling and the coolant pass through the expansion valve for battery and the heat exchanger for battery, and the pressure sensor is configured to detect the pressure of the coolant at a timing after the coolant passes through the external heat exchanger.

According to this air conditioner for the vehicle, the specific flow path of the coolant is provided. Further, since the pressure sensor detects the pressure of the coolant at a timing the coolant passes through the external heat exchanger which is important to the battery cooling, it is preferably determined precisely whether the coolant pressure which is necessary for the battery cooling is sufficiently secured or not.

In another embodiment of the first aspect of the present invention, the coolant compressed by the compressor passes through the heat exchanger for heating and then passes through the external heat exchanger, an opening-degree adjustable type of expansion valve for heating is provided in a coolant flow path between the heat exchanger for heating and the external heat exchanger such that an opening degree thereof is capable of being fully open, and when heating is executed, the opening degree of the expansion valve for heating is adjusted at a small opening degree, whereby the temperature and the pressure of the coolant is lowered by the coolant's passing through the expansion valve for heating.

According to this air conditioner for the vehicle, the pressure and the temperature of the coolant which has passed through the expansion valve for heating is lowered so sufficiently when the heating is executed that the external heat exchanger can absorb the heat from the outside air sufficiently, so that the heating is preferably executed efficiently. Meanwhile, since the coolant pressure is lowered when the coolant passes through the expansion valve for heating as well as when the coolant passes through the external heat exchanger, there may easily occur the situation where the coolant pressure decreases so excessively that the cooling performance of the heat exchanger for battery is deteriorated. However, by executing a closing control of the grille shutter, the situation where the coolant pressure decreases excessively is prevented.

In another embodiment of the first aspect of the present invention, the control unit is configured to control the opening/closing of the grille shutter based on a predetermined basic condition, and when the pressure of the coolant detected by the pressure sensor is the specified pressure or lower, the control unit is configured to make the grille shutter in the closed state compulsorily in preference to the basic condition.

According to this air conditioner for the vehicle, since the opening/closing control of the grille shutter is executed based on the basic condition and when the coolant pressure becomes the specified pressure or lower, the grille shutter is closed compulsorily in preference to the basic condition, the situation where the coolant pressure decreases excessively is prevented.

A second aspect of the present invention is an air conditioner for a vehicle, comprising a battery as a power supply source of a motor for vehicle driving, a compressor to compress coolant, a heat exchanger for heating to heat a cabin inside, an external heat exchanger capable of introducing traveling air thereinto and to perform heat exchange between outside air and coolant, an expansion valve for cooling and a heat exchanger for cooling which are provided to cool the cabin inside, an expansion valve for battery and a heat exchanger for battery which are provided to cool the battery, an opening/closing type of grille shutter to change an introduction state of the traveling air introduced into the external heat exchange, a temperature sensor to detect temperature of the battery, and a control unit to control opening/closing of the grille shutter, wherein the coolant is shared among the heat exchanger for heating, the external heat exchanger, the heat exchanger for cooling, and the heat exchanger for battery, the coolant is made to flow into the heat exchanger for battery from the expansion valve for battery when the temperature of the battery detected by the temperature sensor is a specified temperature or higher, and the control unit is configured to make the grille shutter in a closed state when heating is executed and the temperature of the battery detected by the temperature sensor is the specified temperature or higher.

According to this air conditioner for the vehicle, when the coolant pressure decreases so greatly that the heating is executed and also when the battery temperature so becomes the specified temperature or higher that cooling of the battery is required, the heat exchange performance of the external heat exchanger is lowered by closing the grille shutter, so that the situation where the coolant pressure decreases excessively is prevented and thereby the battery cooling can be performed sufficiently.

In an embodiment of the second aspect of the present invention, the coolant compressed by the compressor passes through the heat exchanger for heating and then passes through the external heat exchanger, passing of the coolant through the expansion valve for cooling and the heat exchanger for cooling and passing of the coolant through the expansion valve for battery and the heat exchanger for battery are respectively executed after the coolant passes through the external heat exchanger, an opening-degree adjustable type of expansion valve for heating is provided in a coolant flow path between the heat exchanger for heating and the external heat exchanger such that an opening degree thereof is capable of being fully open, and when heating is executed, the opening degree of the expansion valve for heating is adjusted at a small opening degree, whereby the temperature and the pressure of the coolant is lowered by the coolant's passing through the expansion valve for heating.

According to this air conditioner for the vehicle, the specific coolant flow path can be provided. Further, when the heating is executed, the pressure and the temperature of the coolant is so sufficiently lowered when the coolant passes through the expansion valve for heating that the heat can be absorbed sufficiently from the outside air by the external heat exchanger, so that the heating is preferably executed efficiently. Meanwhile, the pressure of the coolant is lowered both when the coolant passes through the expansion valve for heating as well as when the coolant passes through the external heat exchanger. Herein, while there may easily occur a situation where the coolant pressure decreases excessively and thereby the cooling performance of the heat exchanger for battery is deteriorated, this situation of the excessive pressure decrease of the coolant is prevented properly by the closing control of the grille shutter.

In another embodiment of the second aspect of the present invention, the control unit is configured to control the opening/closing of the grille shutter based on a predetermined basic condition, and when the heating is executed and the temperature of the battery detected by the temperature sensor is the specified temperature or higher, the control unit is configured to make the grille shutter in the closed state compulsorily in preference to the basic condition.

According to this air conditioner for the vehicle, by controlling such that the opening/closing control of the grille shutter is executed based on the basic condition in a normal time but the grille shutter is closed in preference to the basic condition in a case where the heating is executed and the battery cooling is required, the situation of the excessive pressure decrease of the coolant can be prevented from occurring.

In another embodiment of the second aspect of the present invention, at least one of a vehicle speed and outside-air temperature is set as a parameter of the basic condition.

According to this air conditioner for the vehicle, the basic condition of the opening/closing control of the grille shutter can be preferably set to be based on at least one of the vehicle speed and the outside-air temperature which greatly influence the heat-exchange performance of the external heat exchanger. In particular, by setting the basic condition to be based on at least the vehicle speed, the heat-exchange performance of the external heat exchanger and the reduction performance of air resistance can be improved at a high level.

The present invention will become apparent from the following description which refers to the accompanying drawings.

BRIEF DESCRIPTION OF THE DRAWINGS

FIG. 11 is a flowchart showing a third control example of the present invention.

DETAILED DESCRIPTION OF THE INVENTION

Figure 1:
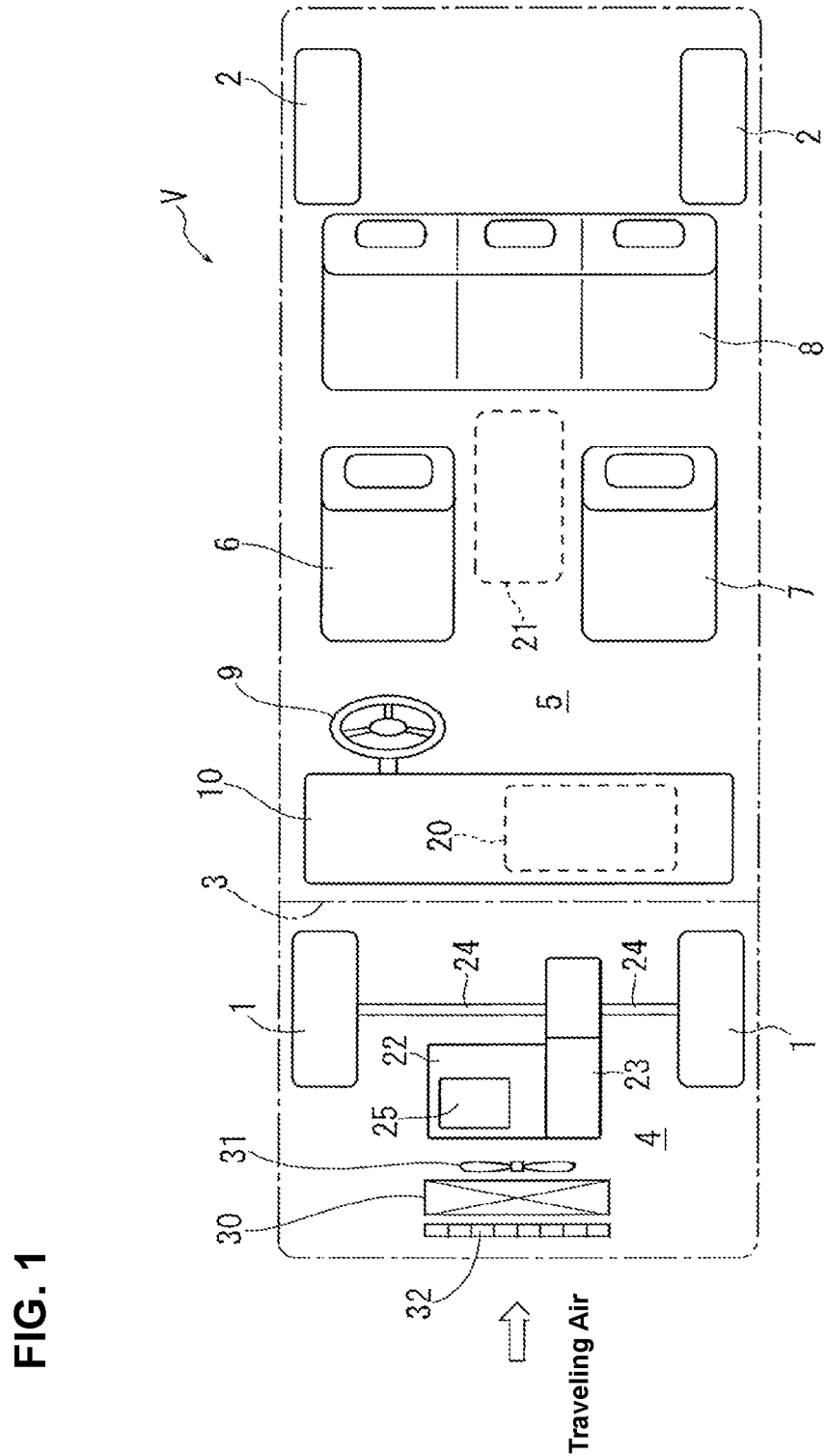
FIG. 1 is a schematic plan view showing an example of a vehicle to which the present invention is applied.

FIG. 1 shows an example of a vehicle V to which the present invention is applied. The vehicle V is an electric automobile described below. In the figure, reference character 1 denotes right-and-left front wheels and reference character 2 denotes right-and-left rear wheels. Herein, a left side of FIG. 1 shows a vehicle front side.

The vehicle V comprises a dash panel 3 which extends in a lateral direction just in back of the front wheels 1. A front-side motor storage room (corresponding to an engine room) 4 and a rear-side cabin 5 are partitioned by the dash panel 3. A driver's seat 6, an assistant driver's seat 7, and a rear seat 8 are provided in the cabin 5. Reference character 9 denotes a steering wheel.

An instrument panel 10 which extends in the lateral direction is provided in the cabin 5 at a position located right behind the dash panel 3. An air conditioning unit 20 which will be described later is provided inside the instrument panel 10. Further, a battery 21 having a large capacity is provided below a floor surface of the cabin 5. In the embodiment, the battery 21 is stored inside a tunnel which is formed at a central portion, in a vehicle width direction, of a floor panel, but an arrangement position of this battery 21 can be located at any position.

A motor 22 is provided inside the motor storage room 4. A driving force of the motor 22 is transmitted to the right-and-left front wheels 1 via a transaxle 23 and a pair of right-and-left drive shafts 24. The vehicle V is an FF vehicle in which the front wheel 1 is a driving wheel and the rear wheel 2 is a driven wheel.

An invertor 25 is attached to the motor 22. A power is transmitted between the battery 21 and the motor 22 via the invertor 25. That is, the power is supplied from the battery 21 to the motor 22, whereby the vehicle is driven. Further, when the vehicle is decelerated, the motor 22 serves as a generator and the battery 21 is charged (regeneration). Herein, this vehicle V may be a four-wheel drive vehicle, a vehicle in which the number of motor for driving may be two or more, or a vehicle in which an in-wheel type of motor is used.

An external heat exchanger 30 is provided at a front portion of the motor storage room 2. This external heat exchanger 30 performs heat exchange between coolant which flows therein and outside air, which will be described later. The external heat exchanger 30 is configured to receive traveling air and perform the heat exchange between the outside air and the coolant efficiently. A cooling fan 31 is provided right behind the external heat exchanger 30. The outside air can be introduced into the external heat exchanger 30 by operating the cooling fan 31 even when the vehicle V is stopped.

A opening/closing type of grille shutter 32 is provided just in front of the external heat exchanger 30. The traveling air is possibly introduced into the external heat exchanger 30 when the grille shutter 32 is opened, Further, when the grille shutter 32 is closed, the introduction of the traveling air into the external heat exchanger 30 is restricted.

The grille shutter 32 basically improve the aerodynamic characteristic of the vehicle V. That is, when the grille shutter 32 is closed, the air resistance of the vehicle V is reduced. The embodiment is basically configured such that the grille shutter 32 is closed when the vehicle speed is a specified vehicle speed (e.g., 60 km/h) or higher, whereas the grille shutter 32 is opened when the vehicle speed is lower than the specified vehicle speed (including a stop state of the vehicle V).

In a state where the grille shutter 32 is opened, the heat-exchange performance of the external heat exchanger 30 is improved, and a degree of reduction of the coolant pressure becomes large. The coolant which has passed through the external heat exchanger 30 passes through an expansion valve, and then passes into the heat exchanger to cool the battery 21, whereby the battery 21 is cooled. If the pressure of the coolant which has passed through the external heat exchanger 30 is too low, sufficient expansion of the coolant by the expansion valve is not executed, so that lack of cooling of the battery 21 may occur. Thus, when the pressure of the coolant which has passed through the external heat exchanger 30 is a predetermined pressure or lower, the grille shutter 32 is closed regardless of the vehicle speed (regardless of basic opening/closing condition of the grille shutter 32), so that the heat-exchange performance of the external heat exchanger 30 is lowered. Thereby, a situation where the coolant pressure decreases excessively is so prevented that the cooling of the battery 21 can be executed sufficiently.

The vehicle V does not install any engine (internal combustion engine) as a power source. Accordingly, the air conditioning unit 20 performs air conditioning by using the power of the battery 21. The air conditioning executed by the air conditioning unit 20 is a heat pump type, which will be described later.

The battery 21 generates heat through its power charging/discharging. It is necessary to cool the battery 21 properly such that the temperature of the battery 21 does not exceed an upper-limit temperature (e.g., 60° C.) for its protection. Accordingly, the battery 21 is cooled when the temperature of the battery 21 becomes a specified temperature (e.g., 50° C.), which is set to be lower than the above-described upper limit, or higher, the battery 21 is cooled. The cooling of the battery 21 is executed by utilizing coolant (heat medium) used for the air conditioning unit 20 (the coolant is shared between the air conditioning and the battery 21 for cooling).

Next, an example of a circulation system of the coolant which is set to cool the air conditioning and the battery 21 will be described referring to FIG. 2. Herein, HFC-based coolant, such as R134a, HFO-based coolant, such as R1234yf, carbon dioxide or the like can be used as the coolant, for example.

The air conditioning unit 20 will be described, first. The air conditioning unit 20 comprises an air conditioning passage 41. A switching damper 42 is provided at an inlet of the air conditioning unit 41 so as to switch outside-air introduction or inside-air circulation. A blower 43 is provided near a switching damper 42 inside the air conditioning passage 41. The blower 43 is driven by a motor 44. Herein, all of various kinds of electric device, which will be described later, are operated (driven) by receiving the power supply from the battery 21.

A heat exchanger for cooling 45 is provided downstream of the blower 43 inside the air conditioning passage 41. A portion of the air conditioning passage 41 which is positioned downstream of the heat exchanger 45 is branched into two branch passages 43A, 43B. A heat exchanger for heating 47 is provided at an upstream side inside the branch passage 43A, and an electric heater (e.g., a PTC heater) 48 is provided at a downstream side inside the branch passage 43A. The temperature of the heater 48 is increased through its power supply.

An air-mix damper 49 is provided at respective upstream-side ends of the branch passages 43A, 43B. A ratio of the respective amounts of air which flow through the branch passages 43A, 43B is changed by the air-mix damper 49 (the ratio is changeable within a range of 0-100%).

Respective downstream sides of the branch passages 43A, 43B are continuous to an air-mix chamber 50. Conditioning air inside the air-mix chamber 50 is supplied into the cabin from blow-off ports which are provided at the instrument panel 10 and the like.

Figure 2:
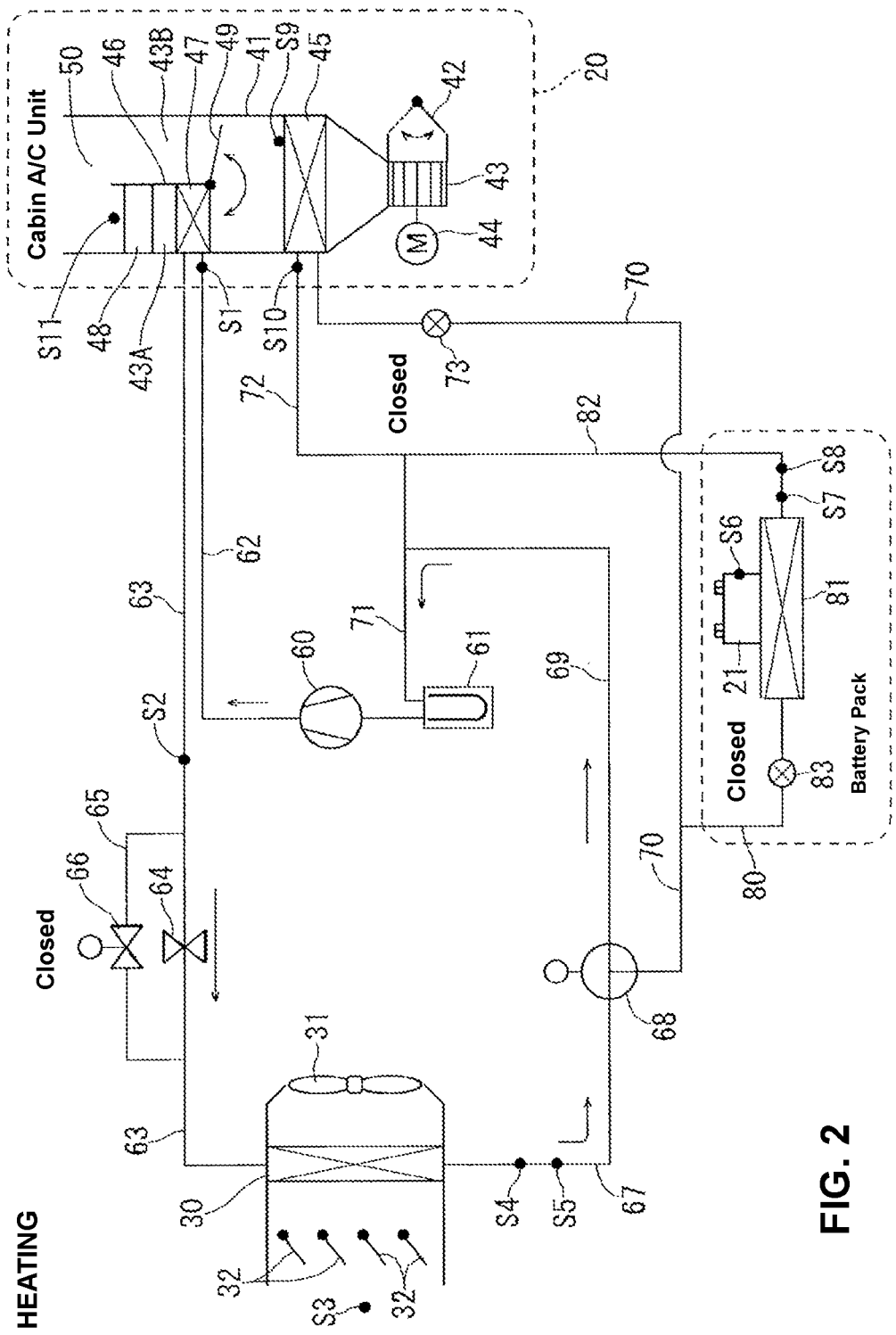
FIG. 2 is a diagram showing an example of a circulation system of coolant, where a coolant flow when heating is executed is shown by arrows.

In FIG. 2, reference character 60 denotes a compressor and reference character 61 denotes an accumulator (gas-liquid separator). The compressor 60 sucks the coolant inside the accumulator 61 and compresses this coolant, which is an electric type which is driven by the power supply from the battery 21.

The coolant which is compressed by the compressor 60 and thereby has the high temperature and the high pressure is supplied to the heat exchanger for heating 47 through a pipe 62. The coolant which has passed through the heat exchanger 47 is supplied to the above-described external heat exchanger 30 through a pipe 63. An orifice 64 to serve as the expansion valve is provided in the middle of the pipe 63. Further, a bypass pipe 65 which bypasses the orifice 64 is provided at the pipe 63, and an electromagnetic type of opening/closing valve 6 is connected to the bypass pipe 65. The orifice 64, the bypass pipe 65, and the opening/closing valve 66 constitute the opening-degree adjustable type of expansion valve which is configured such that its opening degree is capable of being fully open. The function which is performed by the orifice 64, the bypass pipe 65, and the opening/closing valve 66 may be attained by a single valve device.

The coolant having passed through the external heat exchanger 30 flows to an electromagnetic type of switching valve 68 through a pipe 67. Two pipes 69, 70 are coupled to the switching valve 68. The switching valve 68 is configured such that the pipe 67 is selectively connected to the pipe 69 or the pipe 70.

The coolant flowing through the pipe 69 flows into the accumulator 61 through the pipe 71 which is a return pipe. The coolant flowing through the pipe 70 is supplied to the heat exchanger for cooling 45. The coolant having passed this heat exchanger 45 flows into the accumulator 61 through the pipe 72 and the above-described pipe 71.

An electromagnetic and opening-degree adjustable type of expansion valve 73 is connected to the above-described pipe 70 at a position near the heat exchanger 45. The expansion valve 73 is switchable so as to take a fully-closed state and a partially-open state where the coolant is allowed to expand. Further, the expansion valve 73 may be configured such that its opening degree is changeable within a range which can provide the expansion performance of the coolant.

The pipe 70 is provided with a pipe for bypass 80 which is provided to extend out from a position between the switching valve 68 and the expansion valve 73. The coolant flowing through this pipe 80 is supplied to a heat exchanger 81 to cool the battery 21. The coolant having passed through this heat exchanger 81 flows into the accumulator 61 through the pipe 82 and the above-described pipe 71. Herein, the heat exchanger 81 is provided at a vehicle body as a battery pack where the heat exchanger 81 and the battery 21 are integrated.

An electromagnetic and opening-degree adjustable type of expansion valve 83 is connected to the above-described pipe 80. The expansion valve 83 is switchable so as to take a fully-closed state and a partially-open state where the coolant is allowed to expand. Further, the expansion valve 83 may be configured such that its opening degree is changeable within a range which can provide the expansion performance of the coolant.

A circulation path of the coolant is switched by properly switching operational states of the opening/closing valve 66, the switching valve 68, and the expansion valves 73, 83. Hereafter, the circulation path of the coolant will be described about each case of heating, cooling, defrosting, battery cooling, cooling+battery cooling, and heating+battery cooling.

(1) When the heating is executed, the opening/closing valve 66 is closed and the switching valve 68 takes a state where the pipe 69 is selected. Further, the air-mix damper 49 is set at a position which allows the large amount of air-conditioning air to flow through the heat exchanger for heating 47. Herein, since the expansion valves 73, 83 are closed but the coolant does not through the pipes 70, 80, the opening/closing state of the expansion valves 73, 83 is unimportant in particular.

The coolant flows as shown by arrows in FIG. 2 when the heating is executed. That is, the coolant which is compressed by the compressor 60 and thereby has the high temperature and the high pressure passes through the heat exchanger 47, so that the air-conditioning air is heated. The coolant having passed through the heat exchanger 47 passes through the orifice 64, so that the coolant pressure is lowered and the coolant temperature is lowered. The coolant having the lowered pressure and temperature and the outside air are heat-exchanged when the coolant passes through the external heat exchanger 30, so that the coolant is heated (heat absorption of the coolant). The heated coolant is returned to the accumulator 61 through the pipes 67, 69, 71.

(2) When the cooling is executed, the opening/closing valve 66 is opened, the switching valve 68 takes a state where the pipe 70 is selected, the expansion valve 73 is opened, and the expansion valve 83 is closed. Further, the air-mix damper 49 is set at a position which allows the small amount of air-conditioning air to flow through the heat exchanger for heating 47.

Figure 3:
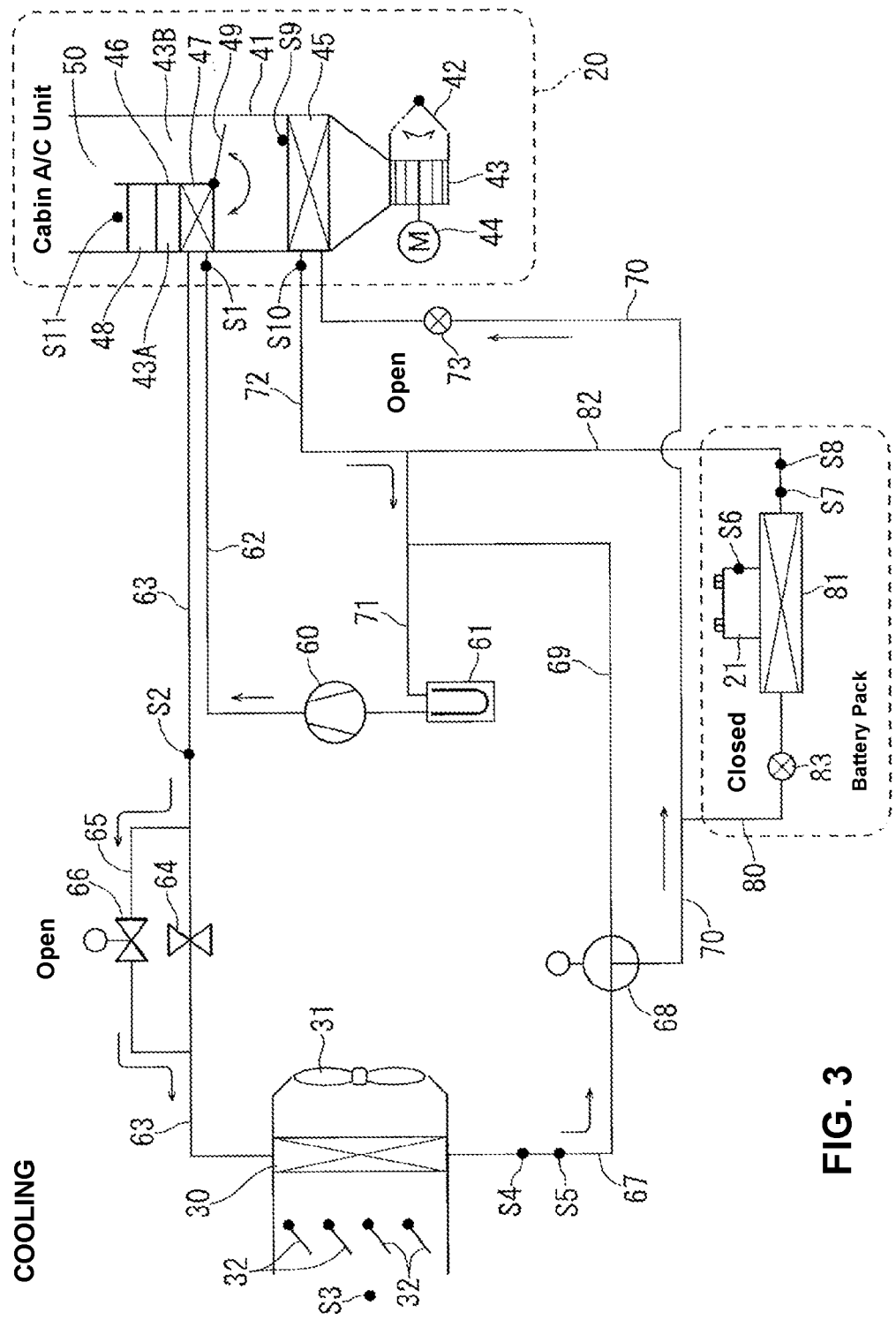
FIG. 3 is a diagram showing the example of the circulation system of the coolant of FIG. 2, where a coolant flow when cooling is executed is shown by arrows.

The coolant flows as shown by arrows in FIG. 3 when the cooling is executed. That is, while the coolant which is compressed by the compressor 60 passes through the heat exchanger 47, the amount of air-conditioning air passing through the heat exchanger 47 is so small (including zero flow amount) that the air-conditioning air is hardly heated. The coolant having passed through the heat exchanger 47 bypasses the orifice 64 and then flows into the external heat exchanger 30. The coolant is cooled by the outside air by means of the external heat exchanger 30 (heat releasing from the coolant).

The coolant having passed through the external heat exchanger 30 passes through the expansion valve 73 from the switching valve 68 through the pipe 70. The pressure of the coolant as well as the temperature of the coolant are lowered by this expansion valve 73. The coolant having the low temperature flows through the heat exchanger for cooling 45 and thereby the air-conditioning air is cooled. The coolant having passed through the heat exchanger 45 is returned to the accumulator 61 through the pipes 72, 71.

Figure 4:
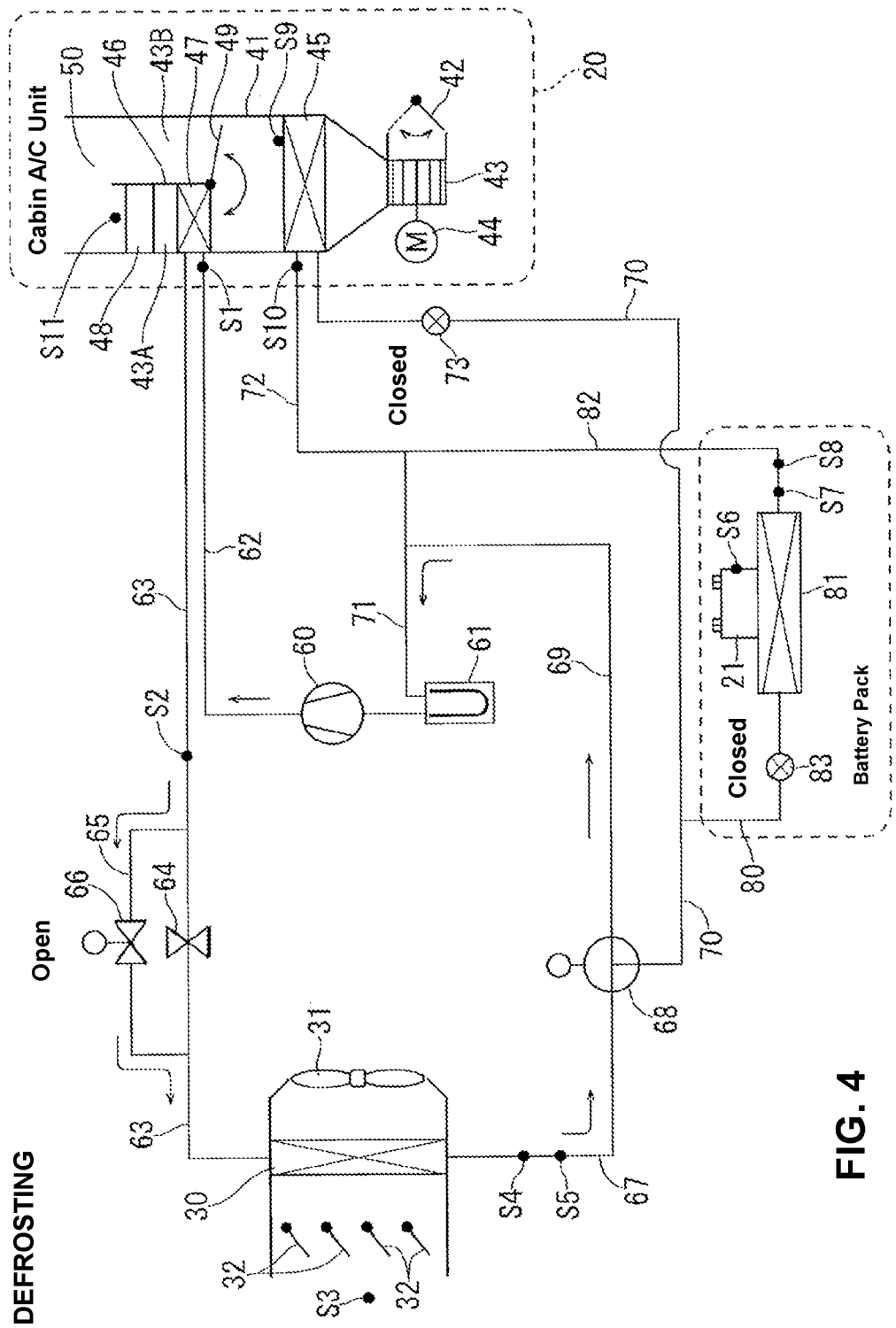
FIG. 4 is a diagram showing the example of the circulation system of the coolant of FIG. 2, where a coolant flow when defrosting is executed is shown by arrows.

(3) The defrosting is executed when frost adhered to the external heat exchanger 30 is removed. The coolant flow when the defrosting is executed is shown in FIG. 4, which is the same as that when the heating is executed which is shown in FIG. 2 except a situation where the coolant passes through the opening/closing valve 66 which has the open state. The coolant flow bypasses the orifice 64, so that the temperature of the coolant which is introduced into the external heat exchanger 30 becomes considerably high compared to a case where the heating is executed. Thereby, the defrosting of the external heat exchanger 30 is executed.

The defrosting is started when it is detected that the frost is generated at the external heat exchanger 30. A sensor to detect the frost directly can be used as this frost-generation detecting sensor, for example, but a sensor to detect the temperature of the coolant is usable as well. That is, for example, since an operation of heating cycle is continuous, it can be detected that the frost is generated at the external heat exchanger 30 when the temperature of the coolant which flows right before the external heat exchanger 30 becomes −20° C. or lower, for example. Thus, the frost-generation detection can be attained by directly detecting the frost or by predicting the frost generation.

(4) When the battery cooling is executed, the opening/closing valve 66 is opened, the switching valve 68 takes the state where the pipe 70 is selected, the expansion valve 73 is closed, and the expansion valve 83 is opened. The battery cooling is executed when the battery temperature is a specified temperature (e.g., 50° C.) or higher.

Figure 5:
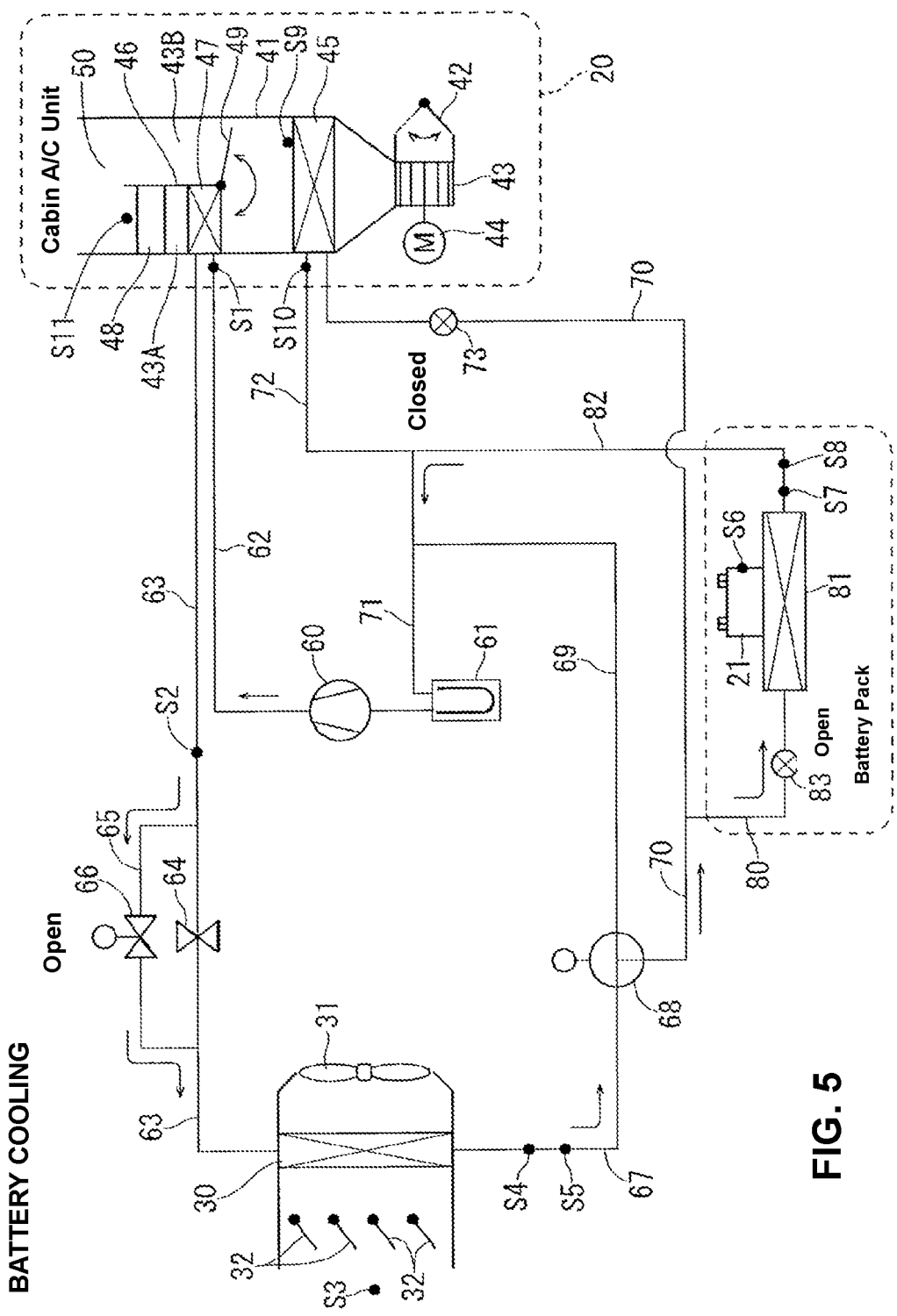
FIG. 5 is a diagram showing the example of the circulation system of the coolant of FIG. 2, where a coolant flow when battery cooling is executed is shown by arrows.

The coolant flows as shown by arrows in FIG. 5 when the battery cooling is executed. That is, the coolant flowing from the compressor 60 passes through the heat exchanger 47, the opening/closing valve 66, the external heat exchanger 30, the switching valve 68, the pipes 70, 80, and the expansion valve 83. The pressure of the coolant and the temperature of the coolant are lowered by the expansion valve 83. The coolant having the low temperature flows into the heat exchanger for battery cooling 81, so that the battery 21 is cooled. The coolant having passed through the heat exchanger 81 is returned to the accumulator 61 through the pipes 82, 71.

When the battery cooling is executed, the coolant receives the heat released from the battery 21 through the heat exchanger for battery cooling 81, and the coolant releases this heat at the heat exchanger 47, whereby the heating of the cabin inside can be performed. Herein, as described above, in a state where the grille shutter 32 is open, the heat-exchange performance of the eternal heat exchanger 30 is improved, and a degree of the pressure lowering (decrease) of the coolant becomes large. The coolant having passed through the external heat exchanger 30 passes through the expansion valve for battery 83 and then flows into the heat exchanger for battery 81, so that the battery 21 is cooled. If the pressure of the coolant having passed through the external heat exchanger 30 is excessively low, sufficient expansion of the coolant by means of the expansion valve for battery is not executed, so that there is a concern that lack of cooling of the battery 21 may occur. Accordingly, in a case where the pressure of the coolant having passed through the external heat exchanger 30 is the predetermined pressure or lower, the grille shutter 32 is controlled to be closed regardless of the vehicle speed (regardless of the basic condition for opening/closing the grille shutter 32) so that the heat-exchange performance of the external heat exchanger 30 can be lowered. Thereby, the situation where the coolant pressure decreases excessively is so prevented that the cooling of the battery 21 can be executed sufficiently.

(5) When the cooing and the battery cooling are executed, the opening/closing valve 66 is opened, the switching valve 68 takes the state where the pipe 70 is selected, and both the expansion valves 73, 83 are opened.

Figure 6:
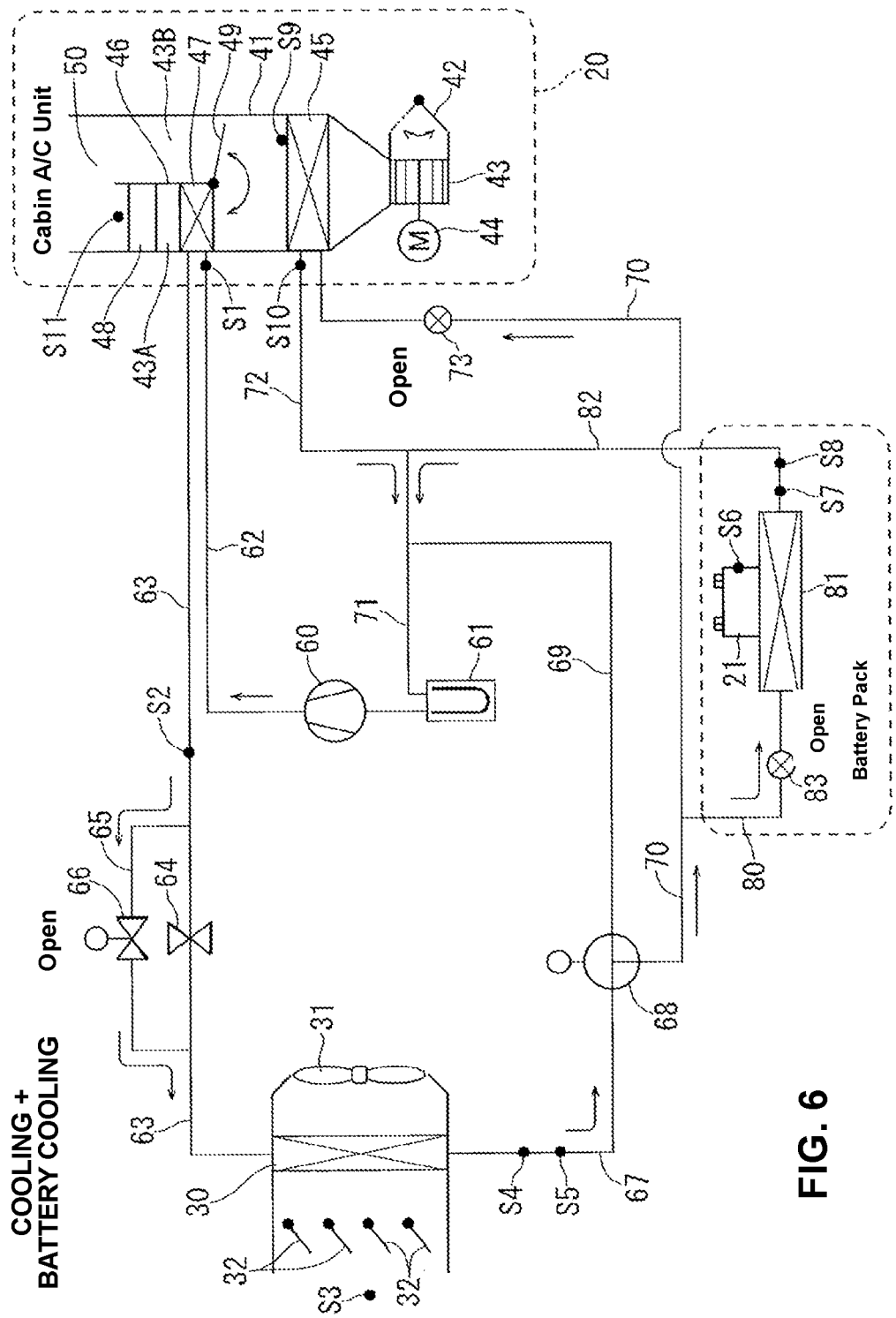
FIG. 6 is a diagram showing the example of the circulation system of the coolant of FIG. 2, where a coolant flow when the cooling and the battery cooling are executed concurrently is shown by arrows.

The coolant flows as shown by arrows in FIG. 6 when the cooling and the battery cooling are executed. That is, the coolant flowing from the compressor 60 passes through the heat exchanger 47, the opening/closing valve 66, the external heat exchanger 30, the switching valve 68, and the pipe 70. The coolant having flowed through the pipe 70 passes through the expansion valve 73 and also passes through the expansion valve 83 through the pipe 80 as well. The pressure of the coolant and the temperature of the coolant are lowered by the expansion valve 73. The coolant having the low temperature flows into the heat exchanger for cooling 45, whereby the air-conditioning air is cooled. At the same time, the pressure of the coolant and the temperature of the coolant are lowered by the expansion valve 83. The coolant having the low temperature flows into the heat exchanger for battery cooling 81, whereby the battery 21 is cooled. Herein, a ratio of the flow amount of the coolant flowing through the heat exchanger 45 and the flow amount of the coolant flowing through the heat exchanger 81 can be changed by adjusting the respective opening degrees of the expansion valves 73, 83. Further, a valve device to change a ratio of the flow amount of the coolant flowing through the expansion valve 73 and the flow amount of the coolant flowing through the expansion valve 83 can be provided additionally.

(6) When the heating and the battery cooling are executed, the heating state shown in FIG. 2 is changed to a manner in which the switching valve 68 takes the state where the pipe 70 is selected. Further, the expansion valve 83 is opened and the expansion valve 73 is closed. Thereby, the coolant whose temperature is lowered by passing through the expansion valve 83 passes through the heat exchanger 81, so that the battery 21 is cooled.

Figure 7:
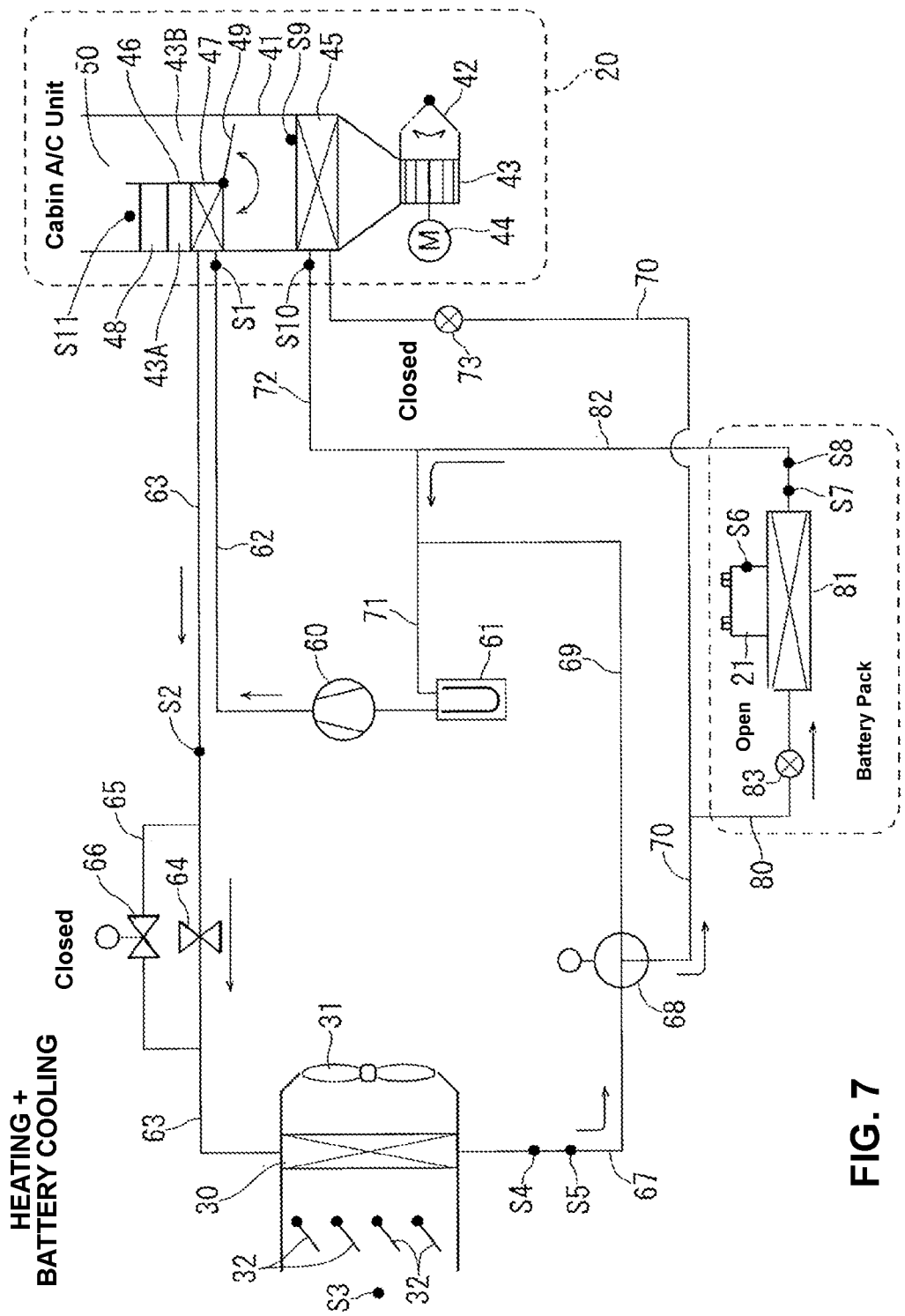
FIG. 7 is a diagram showing the example of the circulation system of the coolant of FIG. 2, where a coolant flow when the heating and the battery cooling are executed concurrently is shown by arrows.

The coolant flows as shown by arrows in FIG. 7 when the heating and the battery cooling are executed. That is, the coolant having passed the external heat exchanger 30 flows from the expansion valve 83 through the heat exchanger for battery cooling 81, compared to the heating case shown in FIG. 2.

In this case, since the coolant passes through the orifice 64 which serves as the expansion valve, the pressure of the coolant may decrease excessively. That is, since the pressure of the coolant whose pressure is lowered greatly by the orifice 64 is further decreased by the external heat exchanger 30, the pressure of the coolant which has just passed through the external heat exchanger 30 (i.e., the pressure of the coolant positioned right upstream of the expansion valve 83) may become excessively low. In this case, the sufficient flow amount of coolant which passes through the expansion valve 83 may not be secured, so that it may be impossible to cool the battery 21 sufficiently by means of the heat exchanger 81.

Therefore, the heat-exchange performance of the external heat exchanger 30 is controlled so as to be lowered when the pressure of the coolant (the pressure of the coolant having just passed through the external heat exchanger 30) is the predetermined pressure or lower. Specifically, the grille shutter 32 is made in the closed state (fully-closed state), so that the outside air is controlled so as not to pass through the external heat exchanger 30 as much as possible. Of course, the grille shutter 31 is stopped as well. Thereby, the pressure decrease (lowering) when the coolant passes through the external heat exchanger 30 is so suppressed that the pressure of the coolant positioned right upstream of the expansion valve 83 can be secured sufficiently. Accordingly, the coolant temperature is lowered so sufficiently when the coolant passes through the expansion valve 83 that the battery 21 can be cooled sufficiently. Further, the flow amount of coolant can be secured by suppressing the coolant pressure from decreasing excessively, so that the cooling of the battery 21 is preferably executed sufficiently. Herein, in a case where the heating is insufficient, an electric type of heater 48 can be operated.

The grille shutter 32 is opened or closed according to the vehicle speed basically as described above. However, when the coolant pressure is the above-described predetermined pressure or lower, the grille shutter 32 is compulsorily closed in preference to the basic opening/closing condition based on the vehicle speed.

Herein, the pressure of the coolant which flows at a position located right before the external heat exchanger 30 is sufficiently high in a case where the coolant does not pass through the orifice 64. Accordingly, even if the heat exchange between the outside air and the coolant is executed sufficiently at the external heat exchanger 30, the pressure of the coolant which has just passed through the external heat exchanger 30 is secured sufficiently, so that there is no problem with the cooling of the battery 21.

Various kinds of sensor S1-S14 are provided at the above-described coolant circulation path. The sensor S1 is a temperature sensor which is provided at the pipe 62 and detects the temperature of the coolant which is discharged from the compressor 60. The sensor S2 is a pressure sensor (high-pressure sensor) which is provided at the pipe 63 and detects the pressure of the coolant. The sensor S3 is a temperature sensor which is provided near the grille shutter 32 and detects the temperature of the outside air. The sensor S4 is a temperature sensor which is provided at the pipe 67 and detects the temperature of the coolant which has just passed through the external heat exchanger 30. The sensor S5 is a pressure sensor which is provided at the pipe 67 and detects the pressure of the coolant which has just passed through the external heat exchanger 30 (low pressure sensor).

The sensor S6 is a temperature sensor which is provided at the battery 21 and detects the temperature of the battery 21. The sensor S7 is a temperature sensor which is provided at the pipe 82 and detects the temperature of the coolant which has just passed through the heat exchanger 81. The sensor S8 is a pressure sensor which is provided at the pipe 82 and detects the pressure of the coolant which has just passed through the heat exchanger for battery cooling 81.

The sensor S9 is a temperature sensor which is provided at the heat exchanger for cooling 45 and detects the temperature of the heat exchanger 45. The sensor S10 is a temperature sensor which is provided at the pipe 72 and detects the temperature of the coolant which has just passed through the heat exchanger 45. The sensor S11 is a temperature sensor which is provided at a right downstream side of the electric type of heater 48 and detects the temperature of the air-conditioning air which has just passed through the heater 48.

Figure 8:
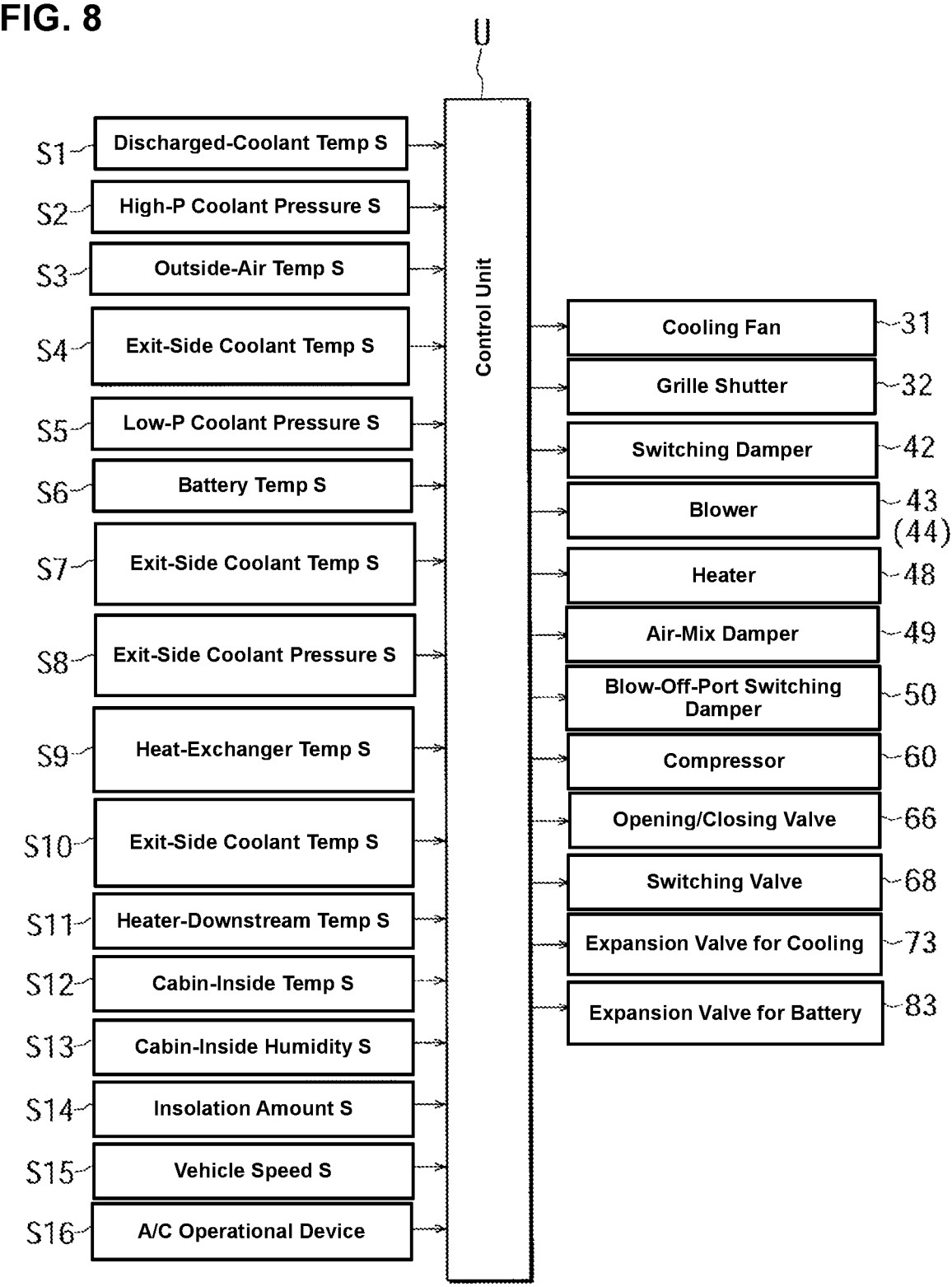
FIG. 8 is a diagram showing an example of a control system of the present invention.

FIG. 8 shows an example of a control system to perform the air-conditioning control including the battery cooling. In the figure, reference character U denotes a control unit configured by using a microcomputer. The control unit U comprises CPU as a controller, ROM and RAM as memories, and an interface.

Signals from the above-described various kinds of sensor S1-S11 and sensors S12-S15 are inputted to the above-described control unit U. The sensor 12 is a temperature sensor to detect the temperature of the cabin inside. The sensor 13 is a humidity sensor to detect the humidity of the cabin inside. The sensor S14 is an insolation amount sensor which is provided inside the cabin and detects the amount of insolation (solar radiation). The sensor S15 is a vehicle speed sensor to detect the vehicle speed.

A signal from an air-conditioning operational device 516 which is operated by a passenger is inputted to the control unit U as well. The air-conditioning operational device 516, which is configured similarly to a conventional device, comprises an ON/OFF switch, a temperature setting switch, an air-amount changing switch, a blow-off-port changing switch, selecting switch to select an auto mode or a manual mode, and others.

The control unit U controls the above-described various kinds of devices shown in FIG. 8 and a blow-off-port switching damper 50 to select the blow-off port for the battery cooling and the air-conditioning control.

The control unit U executes the air-conditioning control, such as the heating and the cooling, properly according to the operation of the above-described air-conditioning operational device 516. Herein, since the air-conditioning control itself is the same as the general air-conditioning control, its further description is omitted here.

The control unit U executes a control for preventing a situation where the coolant pressure decreases excessively when the battery cooling is required. An example of this control will be descried referring to a flowchart shown in FIG. 9. In the following description, Q means a step in the control.

Figure 9:
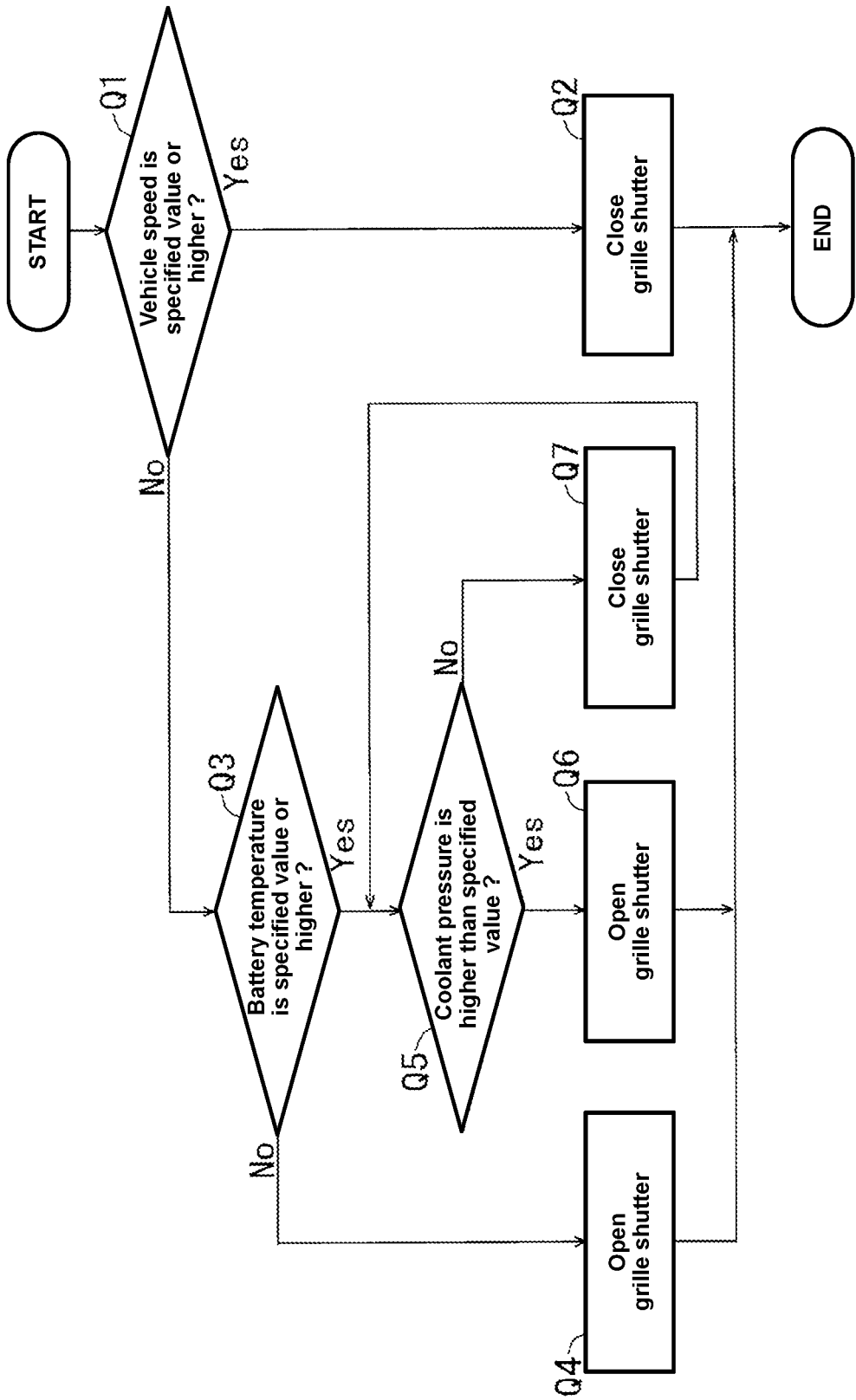
FIG. 9 is a flowchart showing a control example of the present invention.

First, in step Q1 of FIG. 9, it is determined whether or not the vehicle speed detected by the vehicle speed sensor S15 is a specified value (specified vehicle speed: 60 km/h for example) or higher. When the determination of the step Q1 is YES, the griller shutter 32 is closed in step Q2.

When the determination of the step Q1 is NO, it is determined whether or not the temperature of the battery 21 detected by the temperature sensor S6 is a specified value (specified temperature: 50° C. for example) or higher. When the determination of the step Q3 is NO, the griller shutter 32 is opened in step Q4.

When the determination of the step Q3 is YES, it is determined whether or not the coolant pressure detected by the pressure sensor S5 is a specified value (specified pressure) or higher. When the determination of the step Q5 is YES, the griller shutter 32 is opened in step Q6.

When the determination of the step Q5 is NO, the griller shutter 32 is closed in step Q7. Processing from the step Q3 to the step Q7 by way of the step Q5 are configured such that the grille shutter 32 is closed compulsorily in preference to the basic opening/closing condition of the grille shutter 32. By compulsorily closing the grille shutter 32 in the step Q7, the heat-exchange performance of the external heat exchanger 30 is so lowered that the pressure of the coolant which has just passed through the external heat exchanger 30 can be secured sufficiently. Thereby, the flow amount of the coolant at the expansion valve for battery 83 can be secured, so that the cooling of the battery 21 can be performed sufficiently.

Figure 10:
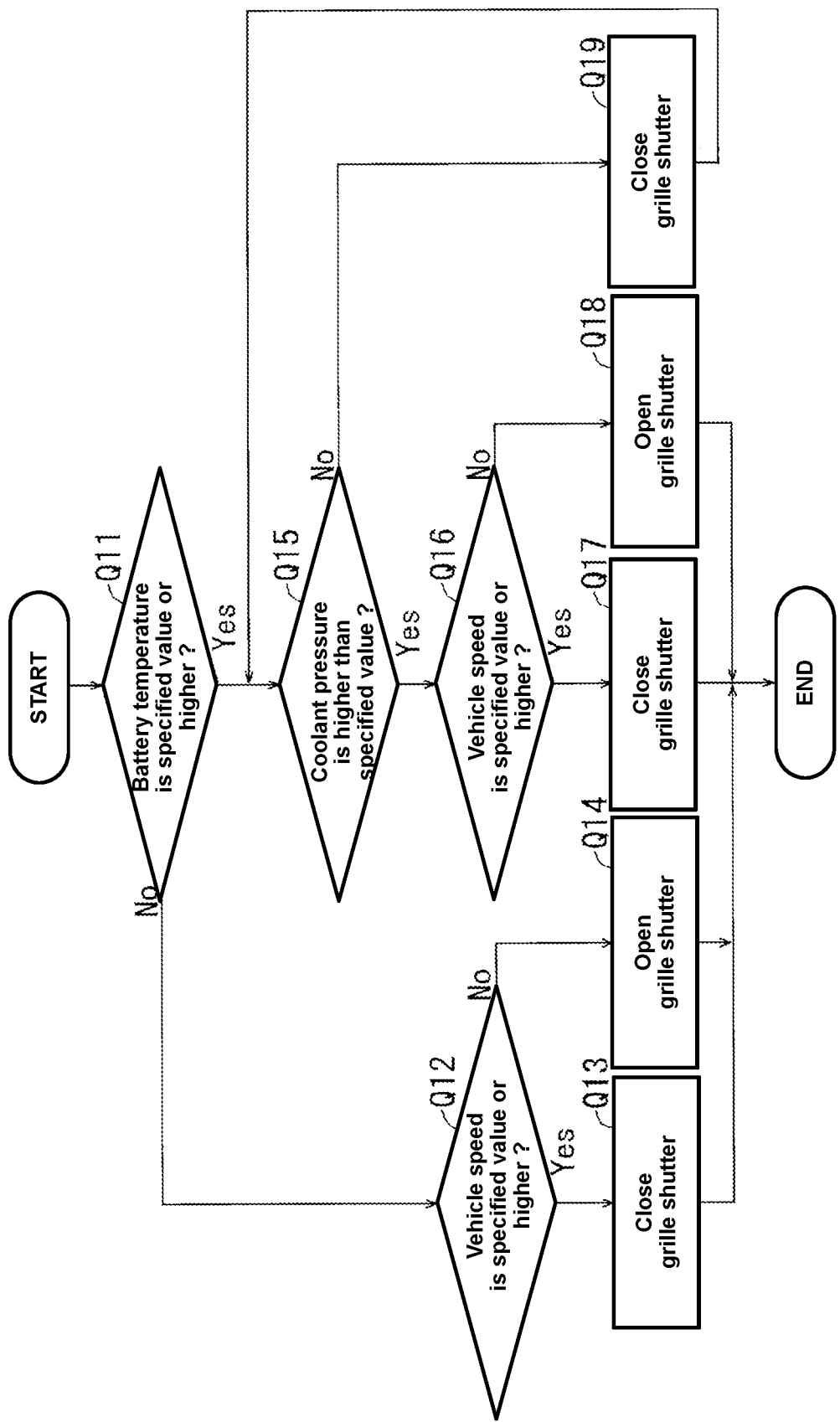
FIG. 10 is a flowchart showing a second control example of the present invention.

FIG. 10 shows a second control example of the present invention. Hereafter, the control example shown in FIG. 10 will be described. First, in step Q11, it is determined whether or not the temperature of the battery 21 detected by the temperature sensor S6 is a specified value (specified temperature: 50° C. for example) or higher. When the determination of the step Q11 is NO, it is determined in step Q12 whether or not the vehicle speed is a specified value (specified vehicle speed: 60 km/h for example) or higher. When the determination of the step Q12 is YES, the griller shutter 32 is closed in step Q13. Meanwhile, when the determination of the step Q12 is NO, the griller shutter 32 is opened in step Q14.

When the determination of the step Q11 is YES, it is determined whether or not the coolant pressure detected by the pressure sensor S5 is a specified value (specified pressure) or higher. When the determination of the step Q15 is YES, it is determined in step Q16 whether or not the vehicle speed is a specified value (specified vehicle speed: 60 km/h for example) or higher. When the determination of the step Q16 is YES, the griller shutter 32 is closed in step Q17. Meanwhile, when the determination of the step Q16 is NO, the griller shutter 32 is opened in step Q18.

When the determination of the step Q15 is NO, the griller shutter 32 is opened in step Q19. Processing of the steps Q3, Q14, Q17, Q18 relate to the opening/closing control of the grille shutter 32 which is executed according to the basic condition where the vehicle speed is set as the parameter. Meanwhile, processing of the step Q19 relates to the control in which the grille shutter 32 is compulsorily closed in preference to the above-described basic condition for improving the cooling performance of the heat exchanger for battery 81.

FIG. 11 shows a third control example of the present invention. Hereafter, the control example shown in FIG. 11 will be described. First, in step Q21, it is determined whether or not the heating is executed. When the determination of the step Q21 is NO, it is determined in step Q24 whether or not the vehicle speed is a specified value (specified vehicle speed: 60 km/h for example) or higher. When the determination of the step Q24 is YES, the griller shutter 32 is closed in step Q25. Meanwhile, when the determination of the step Q24 is NO, the griller shutter 32 is opened in step Q26.

When the determination of the step Q21 is YES, it is determined whether or not the temperature of the battery 21 detected by the temperature sensor S6 is a specified value (specified temperature: 50° C. for example) or higher. When the determination of the step Q22, the control sequence proceeds to step Q24.

When the determination of the step Q22 is YES, the griller shutter 32 is closed in step Q23. Processing of the steps Q25, Q26 relate to the opening/closing control of the grille shutter 32 which is executed according to the basic condition where the vehicle speed is set as the parameter. Meanwhile, processing of the step Q23 relates to the control in which the grille shutter 32 is compulsorily closed in preference to the above-described basic condition for improving the cooling performance of the heat exchanger for battery 81. Herein, the control example shown in FIG. 11 is executed based on assumption that the pressure of the coolant which has just passed through the external heat exchanger 30 becomes lower than a desired pressure when the heating or the battery cooling are executed.

While the embodiments of the present invention have been described, the present invention should not be limited to these and any other modifications or improvements may be applied within the scope of a spirit of the present invention. When the grille shutter 32 is closed in preference to the basic opening/closing condition of the grille shutter 32 for the battery cooling, the rotational speed (compression capability) of the compressor 60 can be increased (up to a limit rotational speed, for example) as well in order to secure the pressure of the coolant having passed through the external heat exchanger 30 sufficiently.

In the case where the grille shutter 32 is compulsorily closed in preference to the basic opening/closing condition, the pressure sensor S8 or S2, for example, can be used as the sensor to detect the coolant pressure in place of the pressure sensor S5. Herein, it is preferable that a sensor to detect the pressure of the coolant having just passed through the external heat exchanger 30 be used as the pressure sensor to detect the coolant pressure (it is preferable that the pressure sensor S5 or S8 be used).

When the cooling and the battery cooling are executed, a ratio of cooling executed by the heat exchanger for cooling 45 and cooling executed by the heat exchanger for battery 81 can be changed as well. For example, a ratio of the opening degree of the expansion valve 73 and the opening degree of the expansion valve 83 can be changed or a flow-amount adjusting valve can be provided newly (for example, a distribution-ratio changing valve can be provided at a joint portion (branch portion) of the pipe 70 and the pipe 80).

When the grille shutter 32 is closed in order to secure the coolant pressure, the pressure decrease at the heat exchanger for heating 47 can be suppressed as well by executing at least one of the flow-amount decrease of the blower 43 and the inside-air circulation. In a case where the inside-air circulation is executed, when the humidity of the cabin inside is high in particular, the outside-air circulation can be executed for a predetermined period of time.

The basic opening/closing condition of the grille shutter 32 can be set according to the outside-air temperature in place of the vehicle speed or according to both the vehicle speed and the outside-air temperature. For example, this setting of the basic opening/closing condition according to the outside-air temperature can be configured such that the grille shutter 32 is closed when the outside-air temperature is the specified temperature or lower, whereas the grille shutter 32 is opened when the outside-air temperature exceeds the specified temperature. Further, the grille shutter 32 can be closed when the vehicle speed is the specified vehicle speed or higher and also this specified vehicle speed can be changed according to the outside-air temperature. In this case, this setting can be configured such that the lower the outside-air temperature is, the lower the specified vehicle speed is, and that the grille shutter is fully closed when the outside-air temperature is the specified temperature or lower. Further, the opening degree of the grille shutter 32 may be changeable not only in two states of a fully-closed state and a fully-open state but in stepwise, such as three stages or more, based on at least one of the vehicle speed and outside-air temperature or continuously variably.

In a case where defogging is executed, the coolant flow can be controlled to be basically the same as the case of the heating. In a case where the humidity is high, the coolant can be controlled so as to pass through the heat exchanger for cooling 45 (dehumidification). The compressor 60 is not limited to a device which is driven by an electric motor receiving a power supply from the battery 21, but the compressor 60 may be driven by using a part of a power of a drive source for vehicle. Of course, the object of the present invention is not limited to what is explicitly described but inexplicitly includes what is substantially described as preferable matters or merits.

What is claimed is:

1. An air conditioner for a vehicle, comprising:
a battery as a power supply source of a motor for vehicle driving;
a compressor to compress a coolant;
a heat exchanger for heating to heat a cabin inside;
an external heat exchanger capable of introducing traveling air thereinto and to perform heat exchange between outside air and the coolant;
wherein the coolant compressed by the compressor passes through the heat exchanger for heating and then passes through the external heat exchanger;
an expansion valve for cooling and a heat exchanger for cooling which are provided to cool the cabin inside;
an expansion valve for battery and a heat exchanger for battery which are provided to cool the battery;
an opening/closing type of grille shutter to change an introduction state of the traveling air introduced into the external heat exchanger;
a pressure sensor proximal an outlet of the external heat exchanger to detect a pressure of the coolant which has been compressed by the compressor, then passed through the heat exchanger for heating, and then passed through the external heat exchanger, wherein the compressor, the heat exchanger for heating, the external heat exchanger, and the pressure sensor are arranged sequentially in that order with respect to a direction of flow of the coolant; and
a control unit to control opening/closing of the grille shutter,
wherein the coolant is shared among said heat exchanger for heating, said external heat exchanger, said heat exchanger for cooling, and said heat exchanger for battery, and said control unit is configured to make said grille shutter in a closed state when the pressure of the coolant detected by said pressure sensor is a specified pressure or lower.

2. The air conditioner for the vehicle of claim 1, further comprising a temperature sensor to detect a temperature of the battery, wherein the coolant is controlled to flow into said heat exchanger for battery from said expansion valve for battery when the temperature of the battery detected by said temperature sensor is a specified temperature or higher, and said control unit is configured to make said grille shutter in the closed state when the pressure of the coolant detected by the pressure sensor is said specified pressure or lower and the temperature of the battery detected by the temperature sensor is said specified temperature or higher.

3. The air conditioner for the vehicle of claim 2, wherein passing of the coolant through said expansion valve for cooling and said heat exchanger for cooling and passing of the coolant through said expansion valve for battery and said heat exchanger for battery are respectively executed after the coolant passes through said external heat exchanger, there is provided a switching device to switch a flow pattern of the coolant after passing through the external heat exchanger among a first pattern, a second pattern, and a third pattern, the first pattern being configured such that the coolant passes through the expansion valve for cooling and the heat exchanger for cooling but the coolant does not pass through the expansion valve for battery and the heat exchanger for battery, the second pattern being configured such that the coolant passes through the expansion valve for battery and the heat exchanger for battery but the coolant does not pass through the expansion valve for cooling and the heat exchanger for cooling, the third pattern being configured such that the coolant passes through the expansion valve for cooling and the heat exchanger for cooling and the coolant pass through the expansion valve for battery and the heat exchanger for battery, and said pressure sensor is configured to detect the pressure of the coolant at a timing after the coolant passes through the external heat exchanger.

4. The air conditioner for the vehicle of claim 3, wherein an opening-degree adjustable type of expansion valve for heating is provided in a coolant flow path between said heat exchanger for heating and said external heat exchanger such that an opening degree thereof is capable of being fully open, and when heating is executed, the opening degree of said expansion valve for heating is adjusted at a small opening degree, whereby the temperature and the pressure of the coolant are lowered by the coolant's passing through the expansion valve for heating.

5. The air conditioner for the vehicle of claim 4, wherein said control unit is configured to control the opening/closing of said grille shutter based on a predetermined basic condition, and when the pressure of the coolant detected by said pressure sensor is said specified pressure or lower, the control unit is configured to make the grille shutter in the closed state compulsorily in preference to said basic condition.

6. The air conditioner for the vehicle of claim 2, wherein an opening-degree adjustable type of expansion valve for heating is provided in a coolant flow path between said heat exchanger for heating and said external heat exchanger such that an opening degree thereof is capable of being fully open, and when heating is executed, the opening degree of said expansion valve for heating is adjusted at a small opening degree, whereby the temperature and the pressure of the coolant are lowered by the coolant's passing through the expansion valve for heating.

7. The air conditioner for the vehicle of claim 2, wherein said control unit is configured to control the opening/closing of said grille shutter based on a predetermined basic condition, and when the pressure of the coolant detected by said pressure sensor is said specified pressure or lower, the control unit is configured to make the grille shutter in the closed state compulsorily in preference to said basic condition.

8. The air conditioner for the vehicle of claim 1, wherein passing of the coolant through said expansion valve for cooling and said heat exchanger for cooling and passing of the coolant through said expansion valve for battery and said heat exchanger for battery are respectively executed after the coolant passes through said external heat exchanger, there is provided a switching device to switch a flow pattern of the coolant after passing through the external heat exchanger among a first pattern, a second pattern, and a third pattern, the first pattern being configured such that the coolant passes through the expansion valve for cooling and the heat exchanger for cooling but the coolant does not pass through the expansion valve for battery and the heat exchanger for battery, the second pattern being configured such that the coolant passes through the expansion valve for battery and the heat exchanger for battery but the coolant does not pass through the expansion valve for cooling and the heat exchanger for cooling, the third pattern being configured such that the coolant passes through the expansion valve for cooling and the heat exchanger for cooling and the coolant pass through the expansion valve for battery and the heat exchanger for battery, and said pressure sensor is configured to detect the pressure of the coolant at a timing after the coolant passes through the external heat exchanger.

9. The air conditioner for the vehicle of claim 8, wherein an opening-degree adjustable type of expansion valve for heating is provided in a coolant flow path between said heat exchanger for heating and said external heat exchanger such that an opening degree thereof is capable of being fully open, and when heating is executed, the opening degree of said expansion valve for heating is adjusted at a small opening degree, whereby the temperature and the pressure of the coolant are lowered by the coolant's passing through the expansion valve for heating.

10. The air conditioner for the vehicle of claim 8, wherein said control unit is configured to control the opening/closing of said grille shutter based on a predetermined basic condition, and when the pressure of the coolant detected by said pressure sensor is said specified pressure or lower, the control unit is configured to make the grille shutter in the closed state compulsorily in preference to said basic condition.

11. The air conditioner for the vehicle of claim 1, wherein an opening-degree adjustable type of expansion valve for heating is provided in a coolant flow path between said heat exchanger for heating and said external heat exchanger such that an opening degree thereof is capable of being fully open, and when heating is executed, the opening degree of said expansion valve for heating is adjusted at a small opening degree, whereby the temperature and the pressure of the coolant are lowered by the coolant's passing through the expansion valve for heating.

12. The air conditioner for the vehicle of claim 1, wherein said control unit is configured to control the opening/closing of said grille shutter based on a predetermined basic condition, and when the pressure of the coolant detected by said pressure sensor is said specified pressure or lower, the control unit is configured to make the grille shutter in the closed state compulsorily in preference to said basic condition.

13. An air conditioner for a vehicle, comprising:
a battery as a power supply source of a motor for vehicle driving;
a compressor to compress a coolant;
a heat exchanger for heating to heat a cabin inside;
an external heat exchanger capable of introducing traveling air thereinto and to perform heat exchange between outside air and the coolant;
an expansion valve for cooling and a heat exchanger for cooling which are provided to cool the cabin inside;
an expansion valve for battery and a heat exchanger for battery which are provided to cool the battery;
an opening/closing type of grille shutter to change an introduction state of the traveling air introduced into the external heat exchanger;
a temperature sensor to detect a temperature of the battery; and
a control unit to control opening/closing of the grille shutter,
wherein the coolant is shared among said heat exchanger for heating, said external heat exchanger, said heat exchanger for cooling, and said heat exchanger for battery, the coolant is made to flow into said heat exchanger for battery from said expansion valve for battery when the temperature of the battery detected by said temperature sensor is a specified temperature or higher, and said control unit is configured to make said grille shutter in a closed state when heating is executed and the temperature of the battery detected by said temperature sensor is said specified temperature or higher; and
wherein said control unit is configured to control the opening/closing of said grille shutter based on a predetermined basic condition, and when the heating is executed and the temperature of the battery detected by said temperature sensor is said specified temperature or higher, the control unit is configured to make the grille shutter in the closed state compulsorily in preference to said basic condition.

14. The air conditioner for the vehicle of claim 13, wherein the coolant compressed by said compressor passes through said heat exchanger for heating and then passes through said external heat exchanger, passing of the coolant through said expansion valve for cooling and said heat exchanger for cooling and passing of the coolant through said expansion valve for battery and said heat exchanger for battery are respectively executed after the coolant passes through said external heat exchanger, an opening-degree adjustable type of expansion valve for heating is provided in a coolant flow path between said heat exchanger for heating and said external heat exchanger such that an opening degree thereof is capable of being fully open, and when heating is executed, the opening degree of said expansion valve for heating is adjusted at a small opening degree, whereby the temperature and the pressure of the coolant are lowered by the coolant's passing through the expansion valve for heating.

15. The air conditioner for the vehicle of claim 14, wherein at least one of a vehicle speed and outside-air temperature is set as a parameter of said basic condition.

16. An air conditioner for a vehicle, comprising:
a battery as a power supply source of a motor for vehicle driving;
a compressor to compress a coolant;
a heat exchanger for heating to heat a cabin inside;
an external heat exchanger capable of introducing traveling air thereinto and to perform heat exchange between outside air and the coolant;
an expansion valve for cooling and a heat exchanger for cooling which are provided to cool the cabin inside;
an expansion valve for battery and a heat exchanger for battery which are provided to cool the battery;
an opening/closing type of grille shutter to change an introduction state of the traveling air introduced into the external heat exchanger;
a temperature sensor to detect a temperature of the battery; and
a control unit to control opening/closing of the grille shutter,
wherein the coolant is shared among said heat exchanger for heating, said external heat exchanger, said heat exchanger for cooling, and said heat exchanger for battery, the coolant is made to flow into said heat exchanger for battery from said expansion valve for battery when the temperature of the battery detected by said temperature sensor is a specified temperature or higher, and said control unit is configured to make said grille shutter in a closed state when heating is executed and the temperature of the battery detected by said temperature sensor is said specified temperature or higher;
wherein said control unit is configured to control the opening/closing of said grille shutter based on a predetermined basic condition, and when the heating is executed and the temperature of the battery detected by said temperature sensor is said specified temperature or higher, the control unit is configured to make the grille shutter in the closed state compulsorily in preference to said basic condition, and
wherein at least one of a vehicle speed and outside-air temperature is set as a parameter of said basic condition.

* * * * *